United States Patent
Ketchum et al.

[11] 3,781,506
[45] Dec. 25, 1973

[54] NON-CONTACTING TEMPERATURE MEASUREMENT OF INDUCTIVELY HEATED UTENSIL AND OTHER OBJECTS

[75] Inventors: Marshall D. Ketchum; Milton D. Bloomer, both of Scotia, N.Y.

[73] Assignee: General Electric Company, Schenectady, N.Y.

[22] Filed: July 28, 1972

[21] Appl. No.: 276,164

[52] U.S. Cl.......... 219/10.49, 219/10.41, 219/10.77
[51] Int. Cl. .............................................. H05b 5/04
[58] Field of Search............... 219/10.49, 10.75, 219/10.77, 502, 10.41; 323/24

[56] References Cited
UNITED STATES PATENTS
3,693,069   9/1972   Kelley et al.......................... 323/24

Primary Examiner—Bruce A. Reynolds
Attorney—John F. Ahern et al.

[57] ABSTRACT

A solid state cool-top induction cooking appliance equipped to set and maintain a selected utensil temperature. A non-contacting temperature sensing technique is based on sensing an inverter power circuit parameter that varies with the utensil temperature, and thus does not require holes in the cooking surface or sensors that project above. The power circuit parameter is typically an interval of oscillation or a damping factor, such as the interval between zero-crossing points of the instantaneous induction heating coil current. The temperature signal derived therefrom is corrected for other circuit factors, for example, a variable input voltage, that also cause a change in the selected power circuit parameter. A user control setting signal can also be summed with the temperature signal. The corrected temperature signal is employed in closed feedback loop fashion to adjust the power coupled to the utensil to maintain the set temperature. The method of measuring and controlling temperature is applicable to inductively heated objects other than cooking utensils, and induction heating apparatus incorporating the temperature control circuitry is useful in a variety of applications.

23 Claims, 10 Drawing Figures

Fig.4a INDUCTION COIL CURRENT, 100°F.

Fig.4b INDUCTION COIL CURRENT, 400°F.

Fig.7 INDUCTION COIL CURRENT AND VOLTAGE

NON-CONTACTING TEMPERATURE MEASUREMENT OF INDUCTIVELY HEATED UTENSIL AND OTHER OBJECTS

BACKGROUND OF THE INVENTION

This invention relates to an induction cooking appliance equipped to measure and set the cooking utensil temperature. More generally, the invention relates to a temperature control circuit and non-contacting method for measuring the temperature of an inductively heated object based on sensing selected electrical parameters of the power circuit energizing the induction heating coil.

Although suitable for temperature control of solid state induction heating apparatus for numerous applications, the invention is explained with regard to induction cooking appliances. Solid state cooking appliances utilizing the principles of induction heating are commonly referred to as the cool-top range and the counter-top range. In addition to the clean-wipe, relatively cool cooking surface and noiseless operation, induction cooking has such desirable user features as fast utensil warmup and responsive heating with low power requirements. A temperature controlled cooking unit, suitable for cooking food by setting a specified temperature, is also useful to prevent overheating of the utensil. Such control is needed because induction heating is so efficient and rapid that an empty cooking utensil can be heated to a dangerously high temperature in a few seconds. To be most advantageous, the temperature sensing technique should be a non-contacting arrangement that measures the utensil temperature directly without requiring holes in the unbroken cooking or utensil support surface that separates the utensil from the coil. It is preferable to have the temperature sensor and circuitry entirely beneath the counter-top utensil support surface of the appliance, without using temperature sensing devices that project above the surface, mats under the utensil, specially constructed utensils, or holes in the utensil support surface, which would be expensive to manufacture.

A series of copending applications were filed by John D. Harnden, Jr. on Dec. 29, 1971 relating to various temperature sensing arrangements for induction cooking appliances, and another copending application was filed on Feb. 22, 1972 by John D. Harnden, Jr. and William P. Kornrumpf. All of these, namely U.S. Pats. Nos. 3,715,550; 3,719,789; 3,742,174; 3,742,175; 3,715,178; 3,742,179; and applications Ser. No. 213,350 and Ser. No. 213,351 (now allowed), are assigned to the assignee of this invention. Although the various disclosed temperature sensing mechanisms are useful, they do not possess all of the attributes discussed. The present invention is based on sensing a power circuit parameter indicative of the utensil temperature. The sensing of a power circuit parameter is disclosed and claimed in copending application Ser. No. 211,926, filed on Dec. 27, 1971 by William P. Kornrumpf and John D. Harnden, Jr., and in copending application Ser. No. 267,143 filed on June 28, 1972 by Robert L. Steigerwald, both assigned to the assignee of this invention. In these two applications, however, the sensed parameter is typically the power thyristor anode voltage and it is used to determine the presence or absence of a coupled utensil or the load condition of the inverter.

SUMMARY OF THE INVENTION

As applied to an improvement in solid state cool-top induction cooking appliances of the type for setting a given cooking utensil temperature, it is recognized that in appropriate static power converters certain electrical parameters of the power circuit vary as a function of the utensil temperature. For example, in series resonant inverters the period of oscillation is substantially proportional to the utensil temperature, being longer for a mild steel utensil at 400°F than at 100°F, and is related to the increase in resistivity and incremental permeability, if the utensil material is magnetic, with increasing temperature. Another parameter indicative of utensil temperature is the damping factor of the induction heating coil current. The preferred technique is to sense successive zero-crossing points of a half sinusoid of the instantaneous induction heating coil current, and to generate an analog temperature signal whose magnitude depends on the variable time interval between them. Other intervals of oscillation or non-oscillation can be used, of course.

Accordingly, a temperature control surface cooking unit includes, as is known, an induction heating coil that is mounted adjacent a substantially unbroken utensil support surface and operated to produce an alternating magnetic field for coupling output power to the utensil. A solid state power converter typically comprising a direct voltage power supply and an inverter power circuit generates an alternating voltage wave for driving the induction heating coil. A temperature control circuit includes sensing means for sensing a predetermined power circuit parameter indicative of the utensil temperature, and also measuring means for producing the temperature signal, which varies with the sensed temperature. Operating in closed feedback loop fashion, the power converter is controlled by the temperature signal to adjust the power coupled to the utensil to obtain the selected utensil temperature. In the preferred embodiment, the direct voltage power supply is controlled to adjust the inverter input voltage.

In practice it is necessary to sense and correct for other variable circuit factors that also cause a change in the predetermined power circuit parameter. Such other circuit factors can include a variable dc input voltage, a variable operating frequency, different utensil materials, and a variable utensil-to-coil separation. In the circuit disclosed the latter three factors are assumed to be constant. Thus, a correction signal dependent on the sensed input voltage is summed with the temperature signal to produce a corrected temperature output signal. Also, a user adjustment control is provided for the typical range of 100°F to 400°F, and a temperature setting signal is an additional input to the summing circuit generating the temperature output signal.

A method of measuring and controlling the temperature of a cooking utensil heated by an induction cooking appliance in accordance with the above explanation is another aspect of the invention. This method is applicable generally to inductively heated objects other than cooking utensils. Likewise, the temperature control circuitry is applicable in general to appropriate solid state induction heating equipment. Remote temperature sensing and control as herein taught is accomplished entirely from beneath the utensil support surface, which need not have holes or other top-side sensors.

DESCRIPTION OF THE PREFERRED EMBODIMENT

Figure 1:
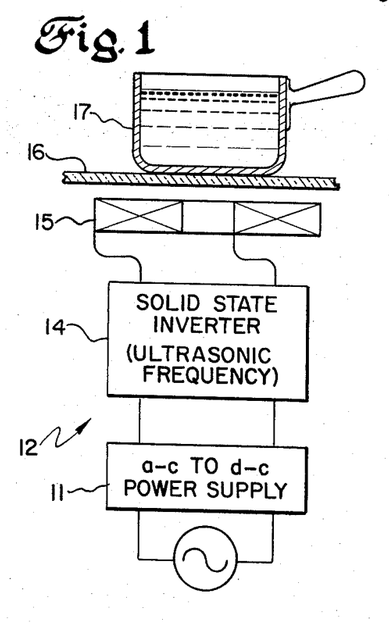
FIG. 1 is a diagrammatic cross-sectional view of an induction surface cooking unit for heating a conventional cooking utensil on a cool utensil support surface, and a block diagram of the power circuit for driving the induction heating coil.

The basic structural features of a solid state induction cooking appliance are illustrated diagrammatically in FIG. 1. Static power conversion circuit 12 is preferably energized by a single phase commercially avaiable 60 Hz, 120 or 240 volt source of alternating voltage, but in appropriate cases can be energized by a battery. As used with an alternating voltage source, static power converter 12 most commonly comprises an a-c to d-c power supply 11 for producing a d-c supply voltage that is converted by a solid state inverter 14 to an ultrasonic frequency voltage wave that drives induction heating coil 15. Power supply 11 preferably is comprised by a full wave bridge rectifier and a simple filter network, with the bridge rectifier being a diode rectifier or a phase controlled rectifier depending upon whether a constant or variable d-c voltage is desired. Induction heating coil 15 is typically a single layer, air-core or ferromagnetic-core coil made with tightly wound braided ribbon conductors or solid flat strip conductors. In the cooking appliance, induction heating coil 15 is approximately mounted in a horizontal position immediately below a non-metallic or substantially non-metallic support plate 16, made for example of a thin sheet of glass or plastic. Plate 16 supports the metallic cooking utensil 17 to be heated, and in an electric range or built-in cooktop is referred to as the counter-top cooking surface. Cooking utensil 17 is an ordinary cooking pot or pan, a frying pan, or some other available metallic utensil used in food preparation, made either of magentic or non-magnetic materials. Operation of static power converter 12 to impress an ultrasonic frequency voltage wave on induction heating coil 15 results in the generation of an alternating magnetic field which is coupled across the air gap and utensil support surface 16 to utensil 17. At an ultrasonic operating frequency in the range of 18–40 kHz, the cooking appliance is inaudible to most people.

Among the advantages of induction cooking are, briefly, that the continuous and unbroken utensil support surface 16 remains relatively cool to the human touch; spilled foods do not burn and char, and hence, both surface 16 and utensil 17 are easy to clean; and the unobstructed utensil support surface is immediately available for other food preparation and cooking tasks. The utensil is heated more uniformly than is the case with a conventional gas range or electric resistance heating range, and transfer of energy to utensil 17 is relatively efficient and consistent whether the range and utensil are new or old. Other desirable user features are the fact utensil warm-up and rapid response to changes in the heating level; noiseless operation; and complete freedom to move the utensil on the utensil support surface since at ultrasonic frequencies there are insignificant reaction forces of either attraction or replusion acting on the utensil. An induction surface cooking unit for use with conventional pots and pans and other cooking utensils such as utensil 17 in FIG. 1 is described more fully in allowed application Ser. No. 200,530, filed on Nov. 19, 1971, by William P. Kornrumpf, now U.S. Pat. No. 3,697,716, and assigned to the same assignee as the present invention. In the domestic induction range or cooktop there disclosed, induction heating coil 15 is a simple flat spiral coil. Further, a useful power range for general cooking is from 1 to 1.5 kilowatts to a lower limit of 100 watts or less in order to perform the common cooking requirements ranging from rapid heating to warming.

Induction surface cooking units are additionally useful to defrost and warm, on the utensil support surface, frozen convenience foods packaged in aluminum foil containers, and to cook and warm foods placed in user-made disposable aluminum foil utensils, on a sheet of aluminum foil, or within foil that is wrapped about the food to achieve an oven effect. An aluminum foil induction cooker in the form of a portable one-coil unit intended to stand on a kitchen counter is described in copending application Ser. No. 245,570, filed on Apr. 19, 1972 by John D. Harnden, Jr. and William P. Kornrumpf, and assigned to the assignee of this invention. To obtain even heating of containers and utensils made of thin metals and metallic foils, coil 15 is an even-heating coil for producing a uniform heating distribution on the inductively heated metal. An induction cooker solely for aluminum foil defrosting and cooking can have a maximum power in the range of 200–400 watts, and an adjustable heating level or temperature may not be required. The optimum thickness of aluminum foil for induction heating is approximately 0.5 mils, the thickness of the widely available heavy duty aluminum foil.

Figure 2:
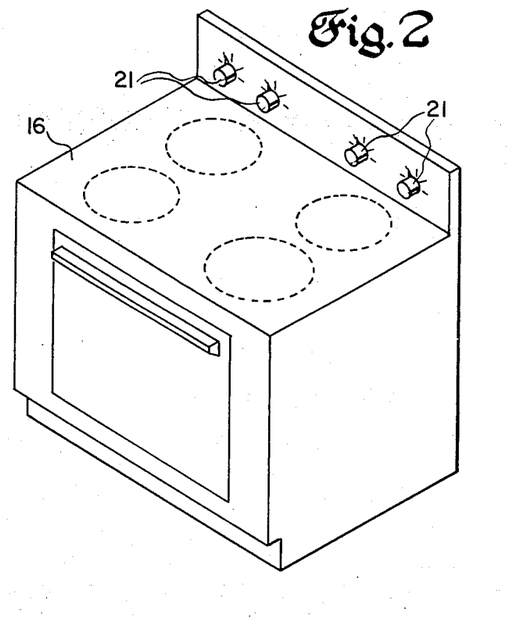
FIG. 2 is a perspective view of an electrical range with a temperature control induction cooktop unit.

The domestic electric range in FIG. 2, incorporates a temperature control induction surface cooking unit constructed according to the teaching of the invention. The counter-top utensil support surface 16 is smooth, continuous, and unbroken, and has four cooking positions indicated in dashed lines. A control knob 21 for each of the four individual units is mounted on the upstanding control panel of the range and turns the individual unit on and off as well as setting the desired utensil temperature. An important feature of the invention is that the complete temperature sensing and control is done beneath the utensil support surface 16, without requiring holes or top-side sensors. The inductively heated utensil can be a conventional pot or pan, the aluminum foil and thin metal containers and utensils identified in application Ser. No. 245,570, or any other metallic implement or device useful in cooking and warming food, all of which are hereafter referred to as utensil 17, Although described with regard to a domestic range, the same principles are applicable to commercial cooking equipment in higher power versions and portable one-coil cooking or warming appliances in lower power versions.

Figure 3:
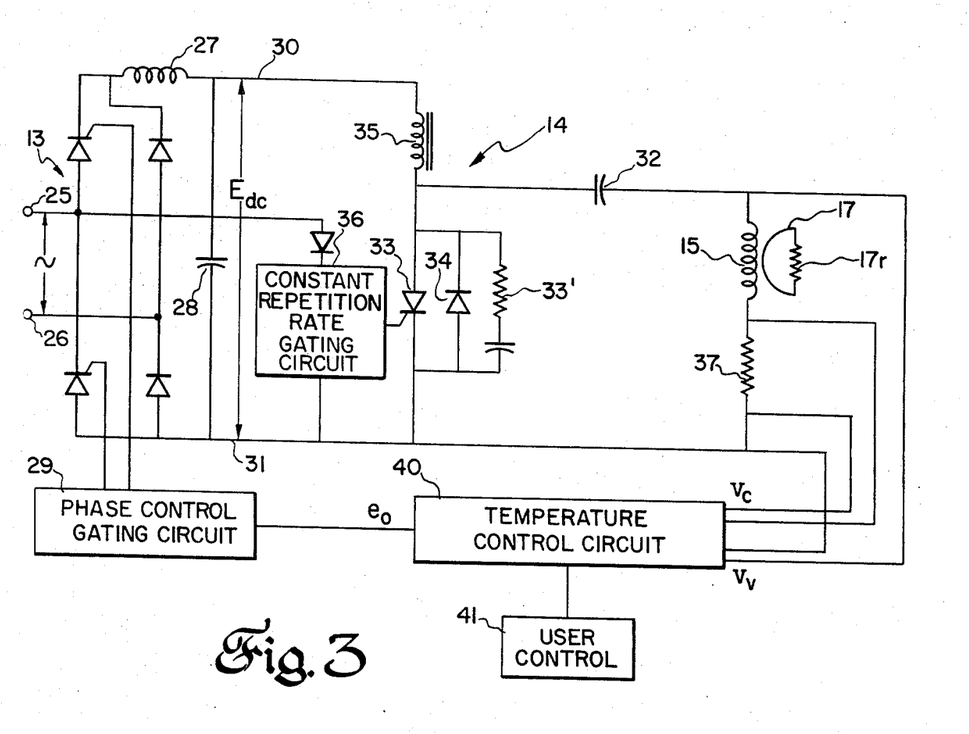
FIG. 3 is a schematic circuit diagram of the solid state power conversion circuit showing in block diagram form the power device gating circuits and the temperature control circuit.

FIG. 3 shows a detailed circuit diagram of a preferred form of d-c power supply 11 and inverter 14 for use with induction cooking appliances and, in block diagram form, a temperature control circuit in accordance with the invention. Inverter 14 is a one-thyristor series resonant inverter with only one gating circuit in which the induction heating coil provides the commutating inductance as well as coupling power to the utensil load. It will be understood that other inverter configurations using other types of power semiconductors such as transistors and different thyristor devices can also be employed. In order to understand the structure and operation of the new temperature control circuit and non-contacting temperature measuring and controlling method, it is necessary to first discuss briefly the converter power circuit. Reference may be made to the previously mentioned allowed application Ser. No. 200,530 now U.S. Pat. No. 3,697,716, for a more complete description of inverter 14. In the preferred embodiment, input terminals 25 and 26 are supplied by a 60 Hz, 120 volt source of single phase alternating voltage. The direct voltage power supply includes a full wave phase controlled rectifier 13 having a pair of silicon controlled rectifiers and a pair of diodes, and a filter network comprised by a series filter inductor 27 and a shunt filter capacitor 28. A phase control gating circuit 29 for the rectifier SCR's is a conventional circuit as given for example in the SCR Manual, 5th Edition, published by the General Electric Company, copyright 1972. Depending on the selected phase angle at which the SCR's are turned on, a variable input voltage $E_{dc}$ for inverter 14 is provided at terminals 30 and 31 of the d-c power supply an is the mechanism for controlling the power coupled to utensil 17. That is, the amplitude of the induction coil current pulses is changed.

Inverter 14 comprises a silicon controlled rectifier or other unidirectional conducting power thyristor 33 connected in series circuit relationship with a reset inductor 35 between d-c terminals 30 and 31. A diode 34 to conduct power current in the reverse direction is connected across the load terminals of thyristor 33. A series snubber RC circuit 33' is also usually connected across the load terminals of thyristor 33 to limit the rate of reapplication of forward voltage to the device which otherwise could falsely trigger thyristor 33 into the conducting state. The basic power circuit is completed by a commutating capacitor 32 and induction heating coil 15 connected in series with one another and coupled directly across the terminals of the inverse-parallel combination of thyristor 33 and diode 34. When either of the power devices is conducting, capacitor 32 and induction heating coil 15 form a series resonant circuit for generating damped sinusoidal current pulses that flow through induction heating coil 15. Reset inductor 35 functions to reset commutating capacitor 32 by charging the commutating capacitor positively during the non-conducting intervals of the thyristor-diode combination. Each cycle of current flow is initiated by a gating pluse applied to thyristor 33 by the constant repetition rate gating circuit 36. Gating circuit 36 derives power from input terminals 25 and 26 and is of conventional construction as described for example in the SCR Manual.

The application of a gating pluse to thyristor 33 by constant repetition rate gating circuit 36 causes it to turn on, energizing the high frequency series resonant circuit essentially comprising commutating capacitor 32 and induction heating coil 15. A damped sinusoidal current pulse flows through induction heating coil 15 and charges commutating capacitor 32 negatively. The amount of damping depends upon the degree of loading of induction heating coil 15. At this point the current in the series resonant circuit reverses and a damped sinusoidal current pulse of the opposite polarity flows through induction heating coil 15 and diode 34. During the time that feedback diode 34 is conducting, thyristor 33 is reverse biased by the voltage across diode 34 and turns off. When the current in the series resonant circuit again attempts to reverse, thyristor 33 does not conduct since it has regained its forward voltage blocking capabilities, and a gating pulse is not applied to the thyristor at this time. Because of the losses in the electrical circuit due mostly to the heating of the utensil, commutating capacitor 32 at the end of the complete conduction cycle on a steady state basis is left charged to a lower voltage than it had at the beginning of the oscillation. During the circuit off-time when both of the power devices 33 and 34 are non-conducting, the additional energy stored in reset inductor 35 is discharged and transferred primarily to commutating capacitor 32, thereby recharging the commutating capacitor 32 to its original voltage level on a steady state basis and thus restoring the commutating capacitor energy which was not during the oscilaltion period. During the energy transfer period some energy is also drawn from the d-c supply through reset inductor 35 to aid in the recharging of commutating capacitor 32.

Figure 4A:
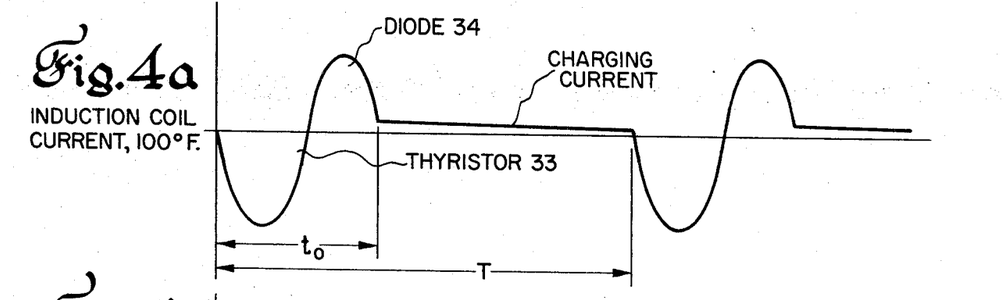
FIGS. 4a and 4b are waveform diagrams of the induction heating coil current respectively at approximately 100°F and 400°F.

FIG. 4a shows the asymmetrical sinusoidal induction coil current for a least one complete cycle of operation for the loaded condition of the inverter, with utensil 17 coupled to coil 15 and being inductively heated to a temperature of 100°F. The components of coil current produced during the high frequency oscillation when conducting through thryistor 33 and diode 34 are labelled. With thyristor 33 conducting the polarity convention used is that the coil current is negative since it flows from terminal 31 to capacitor 32. The time delay interval between successive sinusoidal pulse corresponds to the energy transfer period or non-oscillatory period when there is a small current circulating in coil 15 due to the recharge current of capacitor 32. The oscillatory interval has a period $t_o$ while the inverter operating frequency has a period T. In this circuit the operating frequency, and therefore T, is constant. Another power control technique referred to later is to use a variable operating frequency, in which case T becomes shorter as the gating signal repetition rate increases. In such a case, the circuit transfers more energy from reset inductor 35 and the d-c source to capacitor 32 as the non-oscillatory period $T-t_o$ is made shorter relative to the osicllator period $t_o$, with the result that both the frequency and amplitude of the sinusoidal current pulses increases. The change in amplitude is in addition to that due to varying the inverter input voltage.

The load for inverter 14 is provided by the electrical losses in the utensil. With respect to the utensil load, induction heating coil 15 functions as the primary winding of an air-core transformer. In a physical equivalent circuit for the utensil, identified generally at 17, the utensil functions as a single turn secondary winding with a series resistance 17r connected between the ends of the single turn representing the $I^2R$ or eddy current losses, and hysteresis losses where applicable. The currents and voltages induced in the utensil are determined essentially by the transformer laws.

Figure 4B:
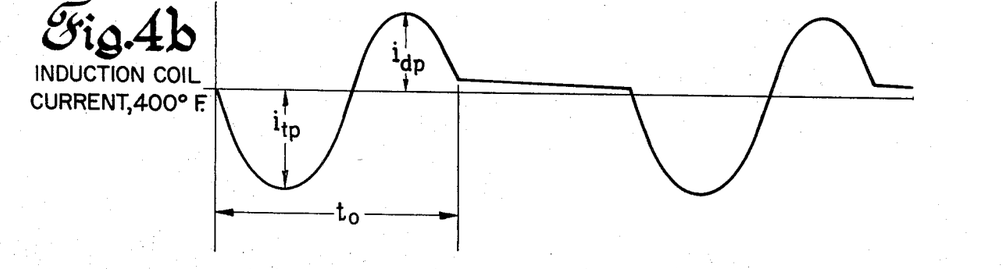

The temperature measuring and control technique as herein desribed in based on sensing a selected inverter power circuit parameter or parameters indicative of the temperature of the inductively heated utensil. One such power circuit parameter is, basically, the period of oscillation $t_o$ of the sinusoidal current pulses, or an interval of oscillation proportional thereto. Another such power circuit parameter is the damping factor of the sinusoidal current pulses. As a corollary, it may be necessary to make a correction for other circuit conditions that also affect the power circuit parameter of interest. To explain this further, FIGS. 4a and 4b show typical waveforms of the induction coil current at the lower and upper limits of a preferred utensil temperature range for domestic induction cooking, namely, 100°F and 400°F. In each case, the inverter operating or output frequency is constant with a period T. The period of oscillationn $t_o$ at 400°F is considerably longer than at 100°F primarily due to the increased losses in the high frequency resonant circuit, as well as some change in inductance, at the higher temperature. Between these two limits there is substantially a linear relationship between the period of oscillation and the temperature. The absolute amplitudes of the induction coil current bears no relationship to the utensil temperature since it is dependent upon the food load being heated. However, the relative amplitudes of the opposite polarity half sinusoidal of induction cil current as expressed by a damping factor does vary linearly with the temperature and is another inverter power circuit parameter indicative of the temperature of the inductively heated utensil. Identifying the peak current while thyristor 33 is conductive at $i_{tp}$ and the peak current while diode 34 is conductive as $i_{dp}$, then the damping factor can for example be defined as the ratio $i_{tp} - i_{dp}/i_{tp}$. The damping factor as so defined is lower at lower utensil temperatures and, due to increased losses, becomes increasingly higher as the utensil temperature increases.

Figure 5:
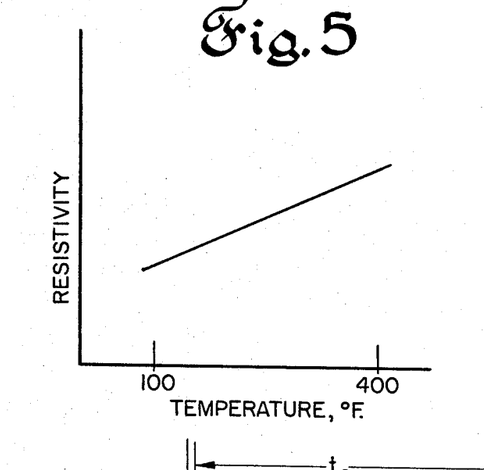
FIG. 5 is a typical resistivity-temperature characteristic for a mild steel cooking utensil.
Figure 6:
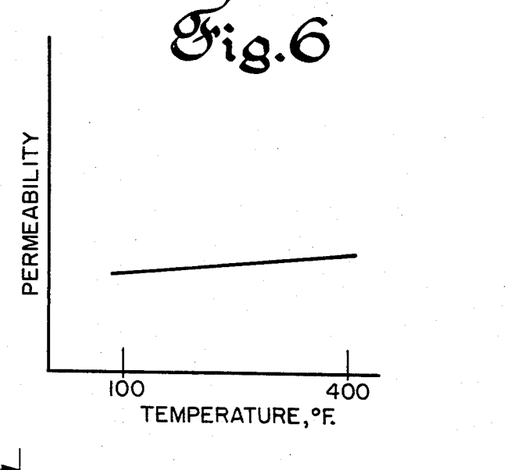
FIG. 6 is a typical magnetic permeability-temperature characteristic for a mild steel cooking utensil.

The variation in resistive losses and the change in inductance as the utensil temperature changes is explained by the temperature dependence of the resistivity of the metallic utensil material and, if magnetic, the temperature dependence of magnetic permeability. Referring to FIG. 5, the resistivity-temperature characteristic of a mild steel utensil material increases substantially linearly in the temperature range of interest, with an absolute value of resistivity at 400°F approximately double that at 100°F. For magnetic utensil materials such as mild steel, the permeability-temperature characteristic as shown in FIG. 6 is also substantially linear with about a 20 percent increase as the temperature goes from 100°F to 400°F. The changes in resistivity and permeability of magnetic utensil metals with temperature are manifested by a temperature dependent change in the period of oscillation and damping factor of the induction coil current, as has been explained. In implementing a temperature measuring and controlling circuit, it is preferable to sense the change in the period of oscillation rather than to sense the change in the damping factor, due to the difficulty in making accurate analog ratio measurements. Either inverter power circuit parameter can be used and essentially the same results are obtained by either technique. Employing the first, it is possible to sense the period of oscillation $t_o$, or some interval of oscillation proportional to $t_o$ such as the zero-crossing points of the negative polarity half sinusoid, the zero-crossing points of the positive half sinusoid (this is not applicable to the waveform of FIG. 4a), or the interval between the respective peak currents of the negative and positive half sinusoids. The preferred technique is to measure the interval of oscillation defined by the zero-crossing points of the negative half sinusoid corresponding to the conduction of thyristor 33.

Figure 8:
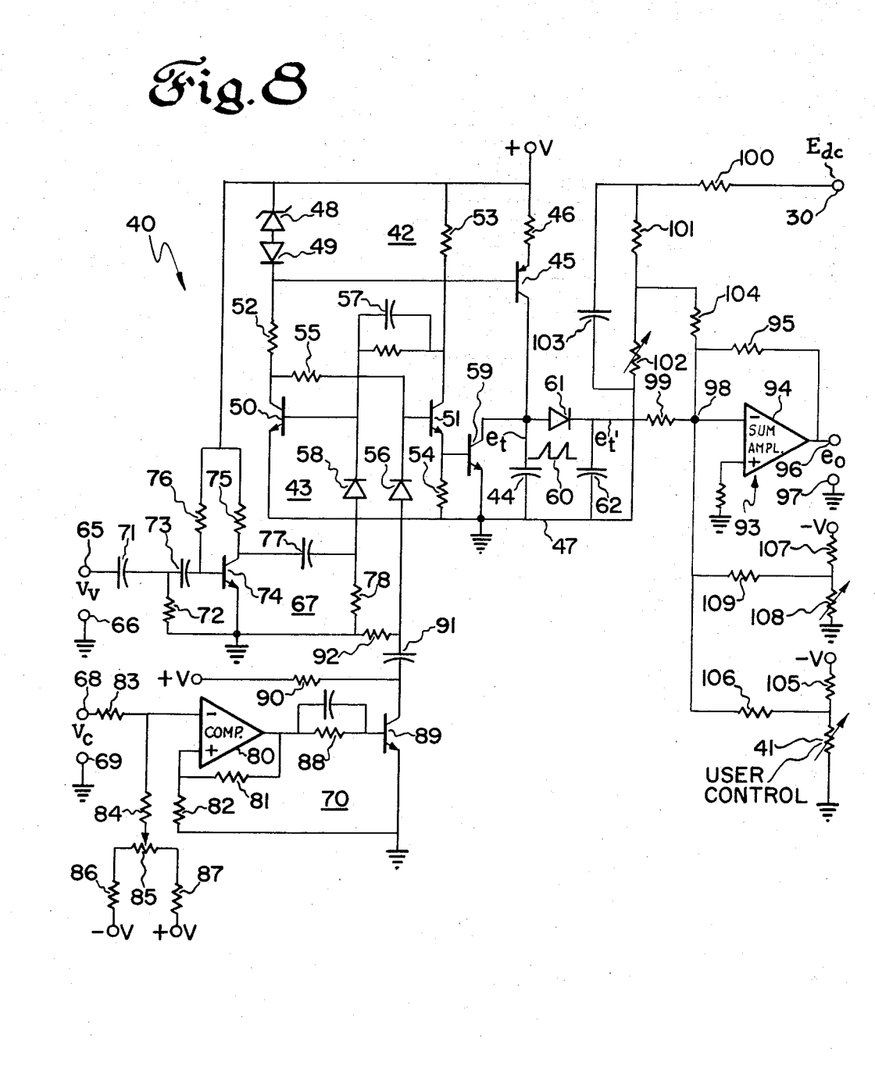
FIG. 8 is a detailed circuit diagram of the preferred embodiment of a temperature control circuit constructed according to the teaching of the invention.

Unfortunately, the change in the period of oscillation $t_o$, or of the interval of oscillation proportional to it, is also proportional to several other factors which affect the total circuit losses and for which correction must be made. Those that are most important are (1) the type of metallic utensil material, (2) the utensil-to-coil separation, (3) the input power level at inverter input terminals 30 and 31, and (4) the inverter operating frequency. These will be discussed in sequence. Different metallic utensil materials show different temperature sensitivities. For example, mild (low carbon) steel usually exhibits a higher sensitivity (mv/°F) than stainless steel. Different utensil metals also exhibit different effects on changing the input power and inverter operating frequency. The temperature measuring and control circuit discussed with regard to FIG. 8 is suitable only for a selected metallic utensil material, namely, enameled cookware made of a mild or low carbon steel, Hence a correction for this factor is not made in the preferred embodiment of the invention. A change in utensil-to-coil separation (see FIG. 1) produces a change in the temperature signal but in normal use this has little effect since temperature control is not necessary while the utensil is being moved. In the present circuit, no correction is made for this factor since it is assumed that coil 15 is stationary and that the utensils are constructed with a flat bottom so that the utensil-to-coil separation is nominally the same. A change in the input power level, exhibited by a variable input voltage $E_{dc}$, and a change in the inverter operating frequency have rather large effects on the temperature signal. Variation of the input voltage from 25 volts to 150 volts dc produces a change in the temperature signal that is as much as twice as large as the temperature signal containing the desired temperature information. A change in inverter operating frequency of several kilohertz produces an error that is about the same magnitude as the temperature signal, again depending upon the utensil material. Both of these error signals are non-linear but the temperature signal can be compensated with a linear correction that produces a total error in the range of ±5° to ±15°F over the total temperature range of 100° to 400°F. In the detailed temperature control circuit shown in FIG. 8, it is assumed that the inverter operating frequency is constant, and accordingly no correction is made. There is, however, a correction for the variable input voltage $E_{dc}$.

Figure 7:
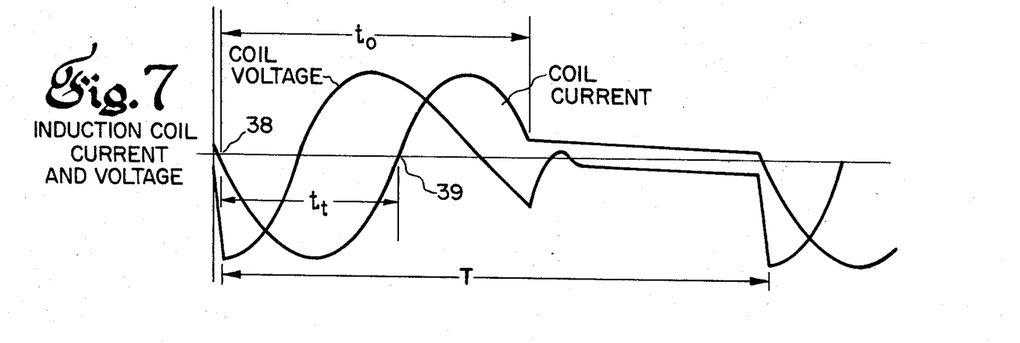
FIG. 7 is a waveform diagram of the induction heating coil current and voltage that is useful in explaining the principles of the invention.

As has been stated, the inverter power circuit parameter that is sensed as a measure of the utensil temperature is preferably, for the inverter configuration shown in FIG. 3, the zero-crossing points 38 and 39 (FIG. 7) of the half sinusoid of induction coil current corresponding to the conduction of thyristor 33. The interval of oscillation between zero-crossing points 38 and 39 is identified as $t_t$. It is within the scope of the invention, of course, to determine these coil current zero-crossings directly, but the temperature control circuit in FIG. 8 utilizes the initial steep negative voltage transition when thyristor 33 is turned on as a measure of the zero-crossing 38. For this reason, the coil voltage waveform is shown in FIG. 7. The negative-to-positive transition of the coil current at zero-crossing point 39 is measured directly, however. Accordingly, the sensed power circuit parameters supplied as input data to temperature control circuit 40 in FIG. 3 are (1) an instantaneous voltage $v_c$ indicative of the instantaneous coil current and (2) the instantaneous coil voltage $v_v$. To sense the coil current, there is in series with coil 15 a current shunt device 37 or some other suitable sensor such as a current transformer or a pair of diodes. The signal $v_c$ is the voltage taken across current sensor 37. The signal $v_v$ is preferably taken across both coil 15 and current sensor 37. A user control 41 sets the specific temperature to which the utensil is to be heated and is typically a potentiometer aranged to be adjusted by turning control knob 21 on the range control panel. The temperature output signal $e_o$ is used in the present circuit to control phase control gating circuit 29, thereby changing the magnitude of the input voltage $E_{dc}$ to inverter 14. Temperature control circuit 40 functions in closed feedback loop manner to control the output power of inverter 14 to maintain the utensil temperature at the set temperature.

The detailed circuit diagram of a preferred form of temperature control circuit 40 is shown in FIG. 8. The control circuit operates at signal level and is energized by positive and negative low voltage sources +V and −V, typically 15 volts. A well-regulated source of low voltage is required, and this can be supplied by a separate power supply or a suitable low voltage power supply for temperature control circuit 40 can be energized by connection between power circuit input terminals 30 and 31. The control circuit can be made with discrete components and as a hybrid or monolithic integrated circuit when suitably designed. Temperature control circuit 40 includes, a major components, a constant current source 42 that is controlled by a bistable multivibrator 43 and cyclically charges a capacitor 44 to provide a one-cycle temperature signal $e_t$. These units, together with a peak detector 61, 62 to be described later, form a measuring means for determining the time interval $t_t$ and producing an analog temperature signal that varies with the sensed utensil temperature. The sensed power circuit information is used to provide turn-on and turn-off pulses that control bistable multivibrator 43 and hence the measuring circuit means. Constant current source 42 is comprised by a control transistor 45 whose emitter-collector is respectively connected to a resistor 46 and to the capacitor 44 between a positive low voltage source +V and a ground terminal 47. Base drive current for control transistor 45 is supplied through a Zener diode 48 and a diode 49 connected between the source +V and the base electrode. Bistable multivibrator 43 comprises a pair of transistors 50 and 51, with the collector-emitter of transistor 50 connected in series with a resistor 52 an diodes 49 and 48 between the source +V and ground terminal 47, and the collector-emitter of transistor 51 respectively connected in series with the resistors 53 and 54 between the source +V and ground terminal 47. The base of transistor 51 is cross-coupled by a resistor 55 to the collector of transistor 50, and is also connected to the cathode of a diode 56 that conducts in response to a signal indicating the second zero-crossing point 39. In similar fashion, the base of transistor 50 is cross-coupled to the collector of transistor 51 by R-C network 57, and is also connected to the cathode of a second diode 58 that conducts in response to a signal effectively indicating the first zero-crossing point 38.

With this arrangement, the switching of transistor 50 to the conducting state completes a circuit path through resistor 50, diode 49, and Zener diode 48 to source +V thereby supplying base drive current that turns on control transistor 45 in constant current source 42. Therefore, capacitor 44 charges linearly and the one-cycle temperature signal $e_t$ is generated in the form of a linear ramp voltage. At the end of the interval of oscillation $t_t$ indicative of the utensil temperature, an input pulse through diode 56 switches transistor 51 to the conducting state, and by means of the cross-coupling connection transistor 50 now turns off. This also renders control transistor 45 nonconducting and terminates the constant current flow that charges capacitor 44. To discharge capacitor 44 cyclically during the interval $T-t_t$, the collector-emitter of a discharge transistor 59 is coupled directly across capacitor 44, and the base of transistor 59 is connected to the emitter of transistor 51 such that both transistors are conductive together and nonconductive together. The one-cycle temperature signal $e_t$ has a sawtooth waveform 60. A peak detector comprising the series combination of a diode 61 and capacitor 62 is connected between the positive terminal of capacitor signal 44 and ground terminal 47. The uncorrected temperature signal $e_{t'}$ at the positive terminal of capacitor 62 is consequently a variable d-c voltage.

The sensed induction coil voltage signal $v_v$ is applied to a pair of input terminals 65 and 66, and a differentiating and pulse generator circuit 67 detects the initial sharp negative transition indicative of the first current zero-crossing point 38 and produces an input pulse for turning on transistor 50 in bistable multivibrator 43. In similar fashion, the voltage signal $v_c$ indicative of the induction coil current is applied to another pair of input terminals 68 and 69, and a zero-crossing detector and pulse generator circuit 70 detects the transition from a negative-going current to a positive-going current and produces an input pulse that turns on transistor 51 in bistable multivibrator 43. Differentiating and pulse generator circuit 67 will be discussed first. A differentiating circuit comprised by the series combination of a capacitor 71 and a resistor 72 is connected between input terminal 65 and ground, and operates to detect the steep leading edge of the voltage waveform generated when thyristor 33 is initially turned on. A coupling capacitor 73 connected to the junction of capacitor 71 and resistor 72 transmits the short pulse so produced to the base of a polarity inverting transistor 74. The collector-emitter of transistor 74 is connected in series with a collector resistor 75 between +V and ground, and resistor 76 connected between +V and the base electrode biases the transistor to the conducting state. The inverted positive-going turn-on pulse produced at the collector of transistor 74 is coupled by a coupling capacitor 77 and diode 58 to the base of transistor 50. When temperature control circuit 40 is deenergized, coupling capacitor 77 discharges through a resistor 78 connected in series with capacitor 77 between the collector of transistor 74 and ground.

Zero-crossing detector and pulse generator circuit 70 has as a main component a comparator circuit 80 that desirably has a hysteresis characteristic. Suitably comparator 80 is a conventional integrated circuit comparator amplifier with a resistor 81 connected between the output and the positive input to provide positive feedback. A small resistor 82 connected between ground and the positive input establishes the reference voltage at approximately zero volts. The input terminal 68 to which the voltage signal $v_c$ is applied is coupled through a pair of voltage divider resistors 83 and 84 to the pointer of a potentiometer 85. The end terminals of potentiometer 85 are respectively connected through identical resistors 86 and 87 to a negative low voltage source −V and an identical positive low voltage source +V. The pointer of potentiometer 85 is adjusted to the zero volts point. The negative input terminal of comparator 80 is connected directly to the junction between resistors 83 and 84 in this arrangement. As the signal $v_c$ indicative of the induction coil current changes from a negative value to a positive value as it passes through zero, the voltage at the negative input of comparator circuit 80 likewise passes through zero and becomes positive. Comparator 80 now produces an output. The effect of the built-in hysteresis characteristic is that the change in output level occurs quickly and stays there until the circuit is reset in the next cycle of operation. Accordingly, noise disturbances in the signal $v_c$ near the axis crossing do not cause false operation of the zero-crossing detector.

The output of comparator circuit 80 is supplied through a parallel resistor-capacitor network 88 to the base of a polarity inverting transistor 89. The collector-emitter conducting path of transistor 89 is connected in series with a resistor 90 between a voltage source +V and ground. Further, a differentiating circuit comprised by the series connected capacitor 91 and resistor 92 is coupled between the collector of transistor 89 and ground. In operation, a negative voltage transistion at the output of comparator 80 is conducted through network 88 and turns off the normally conducting transistor 89. The leading edge of the inverted voltage signal is differentiated by differentiating circuit 91, 92. The sharp positive-going pulse at the junction of capacitor 91 and resistor 92 is fed to coupling diode 56 to thereby turn on transistor 51, resetting bistable multivibrator 43, and consequently turning on discharge transistor 59 to reset capacitor 44.

As was previously mentioned, the uncorrected temperture signal $e_{t'}$ must be corrected to compensate for other factors that also affect the interval of oscillation $t_t$. In the embodiment being discussed, correction need be made only for the variable input d-c voltage $E_{dc}$. For this purpose, a suitable summing circuit 93 is provided. This summing circuit is also the mechanism by which the user sets the desired utensil temperature. Summing circuit 93 suitably is comprised by an operational amplifier 94 with a negative feedback resistor 95 connected between the output and the inverting input. The corrected temperature output signal $e_o$ is taken between the output terminals 96 and 97 of amplifier 94. The various signals affecting the temperature output signal $e_o$ are applied to the summing junction 98 of the summing amplifier. Thus the uncorrected temperature signal $e_{t'}$ is applied through a resistor 99 to summing junction 98. To compensate for the variable input voltage $E_{dc}$, a correction signal proportional to the voltage level at positive input terminal 30 is sensed and also applied to the summing junction. To this end, a resistive voltage divider comprising the series connected resistors 100, 101, and 102, the latter being adjustable, is connected between terminal 30 and grounded terminal 47. A capacitor 103 is preferably connected across resistor 101 and 102. The voltage at the junction of these two resistors is fed through an input resistor 104 to summing junction 98. The component values are selected to make the appropriate correction.

The circuit for setting the desired utensil temperature is comprised by a resistance voltage divider including a resistor 105 connected in series with user adjustment potentiometer 41 between a source −V and ground. The voltage at the junction as adjusted by potentiometer 41 is the temperature setting signal and is applied through input resistor 106 to the summing junction 98. Although not essential, it is desirable to provide, broadly as a part of the utensil temperature setting circuitry, a second factory adjustable resistance voltage divider including resistor 107 and potentiometer 108 connected between the source −V and ground. The junction voltage applied through input resistor 109 to summing junction 98 functions in the nature of a biasing voltage above which the voltage from the user adjustable control varies according to the setting of potentiometer 41.

Figure 9:
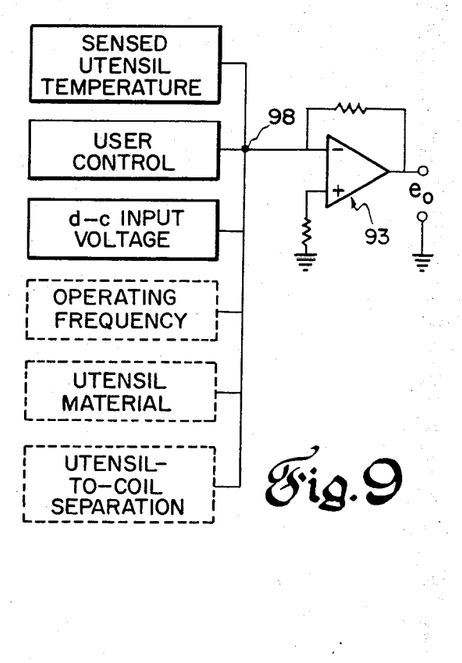
FIG. 9 is a block diagram, in logic form, of the inputs to be summed to obtain a valid temperature output signal.

FIG. 9 shows a logic-type diagram of the various input signals to the summing junction 98 of summing circuit 93, whose algebraic sum determines the corrected temperature output signal $e_o$. The sensed utensil temperature is referred to heretofore as the uncorrected temperature signal $e_{t'}$. The user control is adjusted by control knob 21 on the range control panel and sets the selected utensil temperature. Corrections are made for the other factors, in addition to the sensed utensil temperature, that affect the inverter power circuit parameter that is indicative of the utensil temperature. In the foregoing circuit the d-c input voltage $E_{dc}$ is variable and a correction is made. Other factors that have been mentioned but which are constant in the present circuit are shown in dashed form. A correction can be made for the inverter operating frequency, if it is variable, and for the metallic utensil material, if different types of utensils are used. A correction is made for the utensil-to-coil separation if the coil 15 is movable to adjust the power coupled to the utensil, or if the utensil bottom does not rest on top of the utensil support surface 16 as when the utensil is provided with legs or bumpers. The corrected signal is the temperature output signal $e_o$.

The operation of temperature control circuit 40, FIG. 8, will now be reviewed. It is assumed that control knob 21 on the range control panel and therefore user adjustment potentiometer 41 are set to the selected utensil temperature, as for example the temperature specified by a cooking recipe. Steady state operation is also assumed. As a result of the previous cycle of operation, transistor 51 in bistable multivibrator 43 is conducting and discharge transistor 59 is also turned on to reset capacitor 44. Peak detector 61, 62, however, has a sufficiently long hold period to maintain the uncorrected temperature signal $e_{t_1}$ at the established level. When power thyristor 33 is turned on to initiate a new cycle of operation, the induction coil voltage signal $v_v$ applied to input terminals 65 and 66 is characterized by a steeply sloped negative voltage transition (see FIG. 7). This initial voltage transistion is sensed as an indication of the zero-crossing point 38 of the negative half sinusoid of the induction coil current. The leading edge of the coil voltage waveform is differentiated by differentiating circuit 71, 72, and the narrow negative-going pulse produced is applied through coupling capacitor 73 to a polarity inverting transistor 74. The positive-going pulse produced by differentiating and pulse generating circuit 67 at the collector of transistor 74 is transmitted by coupling capacitor 77 and diode 58 to the base of transistor 50. Transistor 50 accordingly turns on and bistable multivibrator 43 changes state. Since transistor 50 is now conducting, base drive current is supplied through Zener diode 48 and diode 49 to control transistor 45 in constant current source 42, which now becomes conductive. The flow of constant current from +V through resistor 46 and control transistor 45 charges capacitor 44 linearly as shown by waveform 60. Discharge transistor 59, of course, has switched to the nonconducting state as a result of the change of state of bistable multivibrator 43.

The sensing of the zero-crossing point 39 of the induction coil current signal $v_c$ applied to input terminals 68 and 69 occurs at the end of the interval of oscillation $t_i$ being used as the power circuit parameter indicative of the utensil temperature. The negative input of comparator circuit 80 senses the transition of the signal $v_c$ from the negative direction to the positive direction. The pointer of potentiometer 85 is nominally at zero volts, and accordingly the junction between resistors 83 and 84 in the voltage divider arrangement swings through zero to a positive value at the same time. When the negative input of comparator 80 is greater than the positive input, an output signal is produced. A negative transition is coupled by network 88 to the base of normally conducting transistor 89, causing it to turn off. The leading edge of the signal applied to differentiating circuit 91, 92 is differentiated, resulting in a sharp positive pulse that is coupled by diode 56 to the base of transistor 51 in bistable multivibrator 43. Therefore, bistable multivibrator 43 is reset, turning off transistor 50 so that control transistor 45 in constant current source 42 also turns off. The linear ramp voltage on capacitor 44, whose peak value is the sensed one-cycle temperature signal $e_t$, is terminated and sensed by peak detector 61, 62. The output voltage of the peak detector is the uncorrected temperatute signal $e_{t_1}$.

The uncorrected analog temperature signal $e_{t_1}$ is applied through input resistor 99 to the summing junction 98 of summing amplifier 94. To correct for the variable input voltage $E_{dc}$, a portion of the input voltage is sensed by resistive voltage divider 100–102 and applied through input resistor 104 to summing junction 98 as a correction signal. The temperature setting signal representative of the user-set utensil temperature, as determined by the setting of user potentiometer 41, is supplied through input resistor 106 to the summing junction. A factory adjustable biasing voltage determined by the setting of potentiometer 108 is also supplied through input resistor 109 to the summing junction. The corrected or composite temperature output signal $e_o$ obtained at output terminals 96 and 97 represents the algebraic sum of these several input signals.

As best seen in FIG. 3, temperature control circuit 40 functions in closed feedback loop fashion to maintain the utensil temperature at the set value. As the temperature output signal $e_o$ rises in magnitude, phase control gating circuit 29 operates to advance the phase angle of gating the thyristors in phase controlled rectifier 13, thus producing a larger d-c input voltage $E_{dc}$. The actual utensil temperature is sensed by means of the power circuit parameters $v_c$ and $v_v$ as previously described and continuously adjusts the temperature output signal $e_o$ to the value that obtains the set utensil temperature. By way of example of a temperature control circuit that has been built, a temperature output signal $e_o$ of about 500 mv magnitude is produced that is proportional to the temperature of the inductively heated utensil over the range from 100°F to 400°F. For a given utensil material, such as mild steel, and a constant utensil-to-coil separation, the temperature error is about ±10°F. Other techniques can be employed for varying the output power of the inverter to maintain a relatively constant set utensil temperature.

The normal operation of the temperature control cooking appliance prevents dangerous overheating of an empty utensil or one from which the liquid contents have boiled off. In such cases the temperature control knob 21 is set at a given temperature and adjusts the inverter output power. It is to be expected that the output power will be held at a low level and that the unit will be effectively de-energized intermittently to hold the temperature at the set value. Reddening and melting of the utensil does not occur.

Another aspect of the invention is a method for measuring and controlling the temperature of an inductively heated cooking utensil following the teaching of the foregoing description. The basic method includes the steps of a. energizing the static power converter and induction heating coil to produce an alternating magnetic field that couples output power to the utensil, b. sensing a predetermined power circuit parameter indicative of the utensil temperature, c. generating a temperature signal that varies with the sensed utensil temperature, and d. controlling the power converter to adjust the output power in dependence upon the temperature signal to obtain the selected utensil temperature. Additional steps as needed are, of course, to sense and correct the temperature signal for other circuit factors that affect the chosen power circuit parameter, and to provide a user adjustment control that produces a temperature setting signal to be summed with the temperature signal. This method, as will be obvious to those skilled in the induction heating art, is generally applicable for inductively heated objects and workpieces other than cooking utensils. The temperature control technique and circuitry likewise can be incorporated in induction heating apparatus with appropriate solid state power circuitry, with or without a support corresponding to utensil support 16, for heating a variety of objects and workpieces.

In summary, the new temperature control induction cooking appliance is characterized by a non-contacting utensil temperature sensor and control circuit that is located entirely beneath the utensil support surface. Consequently, holes are not required in the utensil support surface, which can be continuous and unbroken. The temperature set by the user can be maintained with only a relatively small error, typically ±10°F for domestic appliances. The temperature measuring and controlling method and induction heating apparatus with the new temperature control circuit are suitable for cooking applications and other induction heating applications.

While the invention has been particularly shown and described with reference to a preferred embodiment thereof, it will be understood by those skilled in the art that the foregoing and other changes in form and details may be made therein without departing from the spirit and scope of the invention.

What we claim as new and desire to secure by Letters Patent of the United States is:

1. A cooking appliance for inductively heating a utensil to a selected temperature comprising
   an induction heating coil mounted adjacent a substantially unbroken utensil support surface for producing an alternating magnetic field,
   a static power conversion circuit including a power circuit for generating an alternating voltage wave that drives said induction heating coil, and
   temperature control circuit means for sensing a predetermined power circuit parameter indicative of the utensil temperature and for controlling said power conversion circuit to obtain a selected utensil temperature, wherein
   said predetermined power circuit parameter indicative of the utensil temperature is a cyclically recurring time interval.

2. A cooking appliance according to claim 1 wherein said time interval indicative of the utensil temperature is an interval of oscillation of said power circuit.

3. A cooking appliance according to claim 1 wherein said temperature control circuit means further includes means for correcting for other variable circuit factors that also cause a change in said predetermined power circuit parameter.

4. A cooking appliance according to claim 3 wherein said static power conversion circuit comprises a variable direct voltage power supply and an inverter power circuit, and said means for correcting for other variable circuit factors includes means for sensing and correcting for the variable direct voltage supplied to said inverter power circuit.

5. A cooking appliance according to claim 3 wherein said temperature control circuit means further includes user control means for setting said selected utensil temperature.

6. A cooking appliance for inductively heating a utensil to a selected temperature comprising
   an induction heating coil mounted adjacent a substantially unbroken utensil support surface for producing an alternating magnetic field,
   a static power conversion circuit including a power circuit for generating an alternating voltage wave that drives said induction heating coil, and
   temperature control circuit means for sensing a predetermined power circuit parameter indicative of the utensil temperature and for controlling said power conversion circuit to obtain a selected utensil temperature, wherein
   said predetermined power circuit parameter indicative of the utensil temperature is an interval of oscillation determined by a pair of zero-crossing points of the instantaneous induction heating coil current.

7. A cooking appliance for inductively heating a utensil to a selected temperature comprising
   an induction heating coil mounted adjacent a substantially unbroken utensil support surface for producing an alternating magnetic field,
   a static power conversion circuit including a power circuit for generating an alternating voltage wave that drives said induction heating coil, and
   temperature control circuit means for sensing a predetermined power circuit parameter indicative of the utensil temperature and for controlling said power conversion circuit to obtain a selected utensil temperature, wherein
   said predetermined power circuit parameter indicative of the utensil temperature is a damping factor dependent upon the relative amplitudes of the instantaneous induction heating coil current.

8. A cooking appliance for inductively heating a cooking utensil to a selected temperature comprising
   an induction heating coil mounted adjacent a substantially non-metallic unbroken utensil support surface and producing an alternating magnetic field,
   a solid state power conversion circuit including a direct voltage power supply and an inverter power circuit for generating an ultrasonic frequency wave that drives said induction heating coil,
   a temperature control circuit comprising sensing means for detecting a predetermined inverter power circuit parameter indicative of the utensil temperature and also comprising measuring means for producing a temperature signal that varies with the sensed utensil temperature, and
   means for controlling said power conversion circuit in dependence upon said temperature signal to obtain a selected utensil temperature, wherein
   said sensing means comprises means for effectively detecting successive zero-crossing points of the instantaneous induction heating coil current.

9. A cooking appliance for inductively heating a cooking utensil to a selected temperature comprising
   an induction heating coil mounted adjacent a substantially non-metallic unbroken utensil support surface and producing an alternating magnetic field,
   a solid state power conversion circuit including a direct voltage power supply and an inverter power circuit for generating an ultrasonic frequency wave that drives said induction heating coil.
   a temperature control circuit comprising sensing means for detecting a predetermined inverter power circuit parameter indicative of the utensil temperature and also comprising measuring means for producing a temperature signal that varies with the sensed utensil temperature, and
   means for controlling said power conversion circuit in dependence upon said temperature signal to obtain a selected utensil temperature, wherein said sensing means detects a cyclically recurring time interval which varies with the utensil temperature, and said measuring means comprises a circuit for generating said temperature signal in the form of an analog signal whose magnitude depends upon the length of said time interval.

10. A cooking appliance for inductively heating a cooking utensil to a selected temperature comprising an induction heating coil mounted adjacent a substantially non-metallic unbroken utensil support surface and producing an alternating magnetic field, a solid state power conversion circuit including a direct voltage power supply and an inverter power circuit for generating an ultrasonic frequency wave that drives said induction heating coil, a temperature control circuit comprising sensing means for detecting a predetermined inverter power circuit parameter indicative of the utensil temperature and also comprising measuring means for producing a temperature signal that varies with the sensed utensil temperature, and means for controlling said power conversion circuit in dependence upon said temperature signal to obtain a selected utensil temperature, wherein said inverter power circuit is a series resonant circuit with alternating intervals of oscillation and non-oscillation, said means detects an interval of oscillation effectively determined by successive zero-crossing points of the instantaneous induction heating coil current, and the appliance further includes user adjustment control means for setting the selected utensil temperature over a range including 100°F to 400°F, said user control means comprising a circuit that produces a temperature setting signal, and a summing circuit for summing said temperature signal and temperature setting signal to produce a corrected temperature signal.

11. A cooking appliance for inductively heating a cooking utensil to a selected temperature comprising an induction heating coil mounted adjacent a substantially non-metallic unbroken utensil support surface and producing an alternating magnetic field, a solid state power conversion circuit including a direct voltage power supply and an inverter power circuit for generating an ultrasonic frequency wave that drives said induction heating coil, a temperature control circuit comprising sensing means for detecting a predetermined inverter power circuit parameter indicative of the utensil temperature and also comprising measuring means for producing a temperature signal that varies with the sensed utensil temperature, and means for controlling said power conversion circuit in dependence upon said temperature signal to obtain a selected utensil temperature, wherein said temperature control circuit further includes user adjustment control means for setting said selected utensil temperature over a range including 100°F to 400°F, and said sensing means detects an interval of oscillation of said inverter power circuit that varies with the utensil temperature, said measuring means comprises a circuit for generating said temperature signal in the form of an analog signal whose magnitude depends upon the length of said interval of oscillation, said temperature control circuit further includes means for sensing and producing a correction signal for at least one other variable circuit factor which also causes a change in said interval of oscillation, and a summing circuit for algebraically summing said temperature signal and said correction signal to produce a corrected temperature signal.

12. A cooking appliance according to claim 11 wherein said user adjustment control means comprises a circuit that produces a temperature setting signal, said temperature setting signal being applied to said summing circuit as an additional input determining said corrected temperature signal.

13. A cooking appliance for inductively heating a cooking utensil to a selected temperature comprising an induction heating coil mounted adjacent a substantially non-metallic unbroken utensil support surface and producing an alternating magnetic field, a solid state power conversion circuit including a direct voltage power supply and an inverter power circuit for generating an ultrasonic frequency wave that drives said induction heating coil, a temperature control circuit comprising sensing means for detecting a predetermined inverter power circuit parameter indicative of the utensil temperature and also comprising measuring means for producing a temperature signal that varies with the sensed utensil temperature, and means for controlling said power conversion circuit in dependence upon said temperature signal to obtain a selected utensil temperature, wherein said temperature control circuit further includes user adjustment control means for setting said selected utensil temperature over a range including 100°F to 400°F, and said sensing means effectively detects successive zero-crossing points of the instantaneous induction heating coil current, said measuring means comprises a circuit for generating said temperature signal in the form of an analog signal whose magnitude depends upon the time interval between said zero-crossing points, and said temperature control circuit also includes means for sensing and producing a correction signal for at least one other variable circuit factor which also causes a change in said time interval, and a summing circuit for algebraically summing said temperature signal and correction signal to produce a corrected temperature signal.

14. A cooking appliance according to claim 13 wherein said user adjustment control means comprises a circuit that produces a temperature setting signal, said temperature setting signal being applied to said summing circuit as an additional input determining said corrected temperature signal.

15. A method of measuring and controlling the temperature of a cooking utensil heated by an induction cooking appliance with an unbroken utensil support surface, said appliance including a static power conversion circuit with an inverter power circuit that drives an induction heating coil, comprising the steps of energizing said static power conversion circuit and induction heating coil to produce an alternating magnetic field for coupling output power to the cooking utensil, sensing a predetermined inverter power circuit parameter indicative of the utensil temperature, generating a temperature signal that varies with the sensed utensil temperature, and controlling said power conversion circuit to adjust said output power in dependence upon said temperature signal to obtain a selected utensil temperature, wherein said step of sensing a predetermined inverter power circuit parameter comprises sensing a cyclically recurring time interval indicative of the utensil temperature.

16. A method as defined in claim 15 including the additional steps of sensing and producing a correction signal for other variable circuit factors that also cause a change in said predetermined power circuit parameter, and correcting said temperature signal therewith.

17. A method as defined in claim 15 including the additional steps of providing a user adjustment control for setting a range of selected utensil temperatures, producing a temperature setting signal dependent upon the setting of said user control, and correcting said temperature signal therewith.

18. A method of measuring and controlling the temperature of a cooking utensil heated by an induction cooking appliance with an unbroken utensil support surface, said appliance including a static power conversion circuit with an inverter power circuit that drives an induction heating coil, comprising the steps of energizing said static power conversion circuit and induction heating coil to produce an alternating magnetic field for coupling output power to the cooking utensil, sensing a predetermined inverter power circuit parameter indicative of the utensil temperature, generating a temperature signal that varies with the sensed utensil temperature, and controlling said power conversion circuit to adjust said output power in dependence upon said temperature signal to obtain a selected utensil temperature, wherein said step of sensing a predetermined inverter power circuit parameter comprises sensing a pair of zero-crossing points of the instantaneous induction heating coil current, said step of generating a temperature signal comprises detecting the variable time interval between said zero-crossing points and producing an analog signal whose magnitude varies with the sensed utensil temperature, and further includes the steps of providing a user adjustment control for setting a range of selected utensil temperatures, producing a temperature setting signal dependent upon the setting of said user control, and correcting said temperature signal therewith.

19. A cooking appliance for inductively heating a cooking utensil to a selected temperature comprising an induction heating coil mounted adjacent a substantially non-metallic unbroken utensil support surface and producing an alternating magnetic field, a solid state power conversion circuit including a direct voltage power supply and an inverter power circuit for generating an ultrasonic frequency wave that drives said induction heating coil, a temperature control circuit comprising sensing means for detecting a predetermined inverter power circuit parameter indicative of the utensil temperature and also comprising means for producing a temperature signal that varies with the sensed utensil temperature, and means for controlling said power conversion circuit in dependence upon said temperature signal to obtain a selected utensil temperature, wherein said sensing means effectively detects a damping factor which varies with the utensil temperature and is dependent upon the relative amplitudes of the instantaneous induction heating coil current.

20. A cooking appliance for inductively heating a cooking utensil to a selected temperature comprising an induction heating coil mounted adjacent a substantially non-metallic unbroken utensil support surface and producing an alternating magnetic field, a solid state power conversion circuit including a direct voltage power supply and an inverter power circuit for generating an ultrasonic frequency voltage that drives said induction heating coil, a temperature control circuit comprising sensing means for detecting a predetermined inverter power circuit parameter that varies substantially linearly with the utensil temperature for different food loads being heated, said temperature control circuit also comprising measuring means for producing a temperature signal that varies with the sensed utensil temperature, and feedback control means for controlling said power conversion circuit in dependence upon said temperature signal to obtain a selected utensil temperature.

21. A cooking appliance according to claim 20 wherein said temperature control circuit further includes means for sensing and correcting for other variable power conversion circuit parameters which also cause a change in said predetermined inverter power circuit parameter.

22. An induction heating apparatus for heating a metallic object to a selected temperature comprising an induction heating coil for producing an alternating magnetic field for coupling power to the metallic object, a solid state power conversion circuit including an inverter power circuit for generating an alternating voltage wave that drives said induction heating coil, and temperature control circuit means for sensing a predetermined inverter power circuit parameter indicative of the object temperature and for controlling said power conversion circuit to obtain a selected object temperature, said predetermined inverter power circuit parameter being a cyclically recurring time interval that varies substantially linearly with the object temperature.

23. An induction heating apparatus according to claim 22 wherein said cyclically recurring time interval is an interval of oscillation determined by a pair of zero-crossing points of the instantaneous induction heating coil current.

* * * * *